(12) United States Patent
Kolavennu et al.

(10) Patent No.: US 6,856,856 B1
(45) Date of Patent: *Feb. 15, 2005

(54) RESIN TRANSFER MOLDING

(75) Inventors: Soumitri N. Kolavennu, Minneapolis, MN (US); Anoop K. Mathur, Shoreview, MN (US); Sanjay Parthasarathy, Edina, MN (US); Wendy Foslien Graber, Minneapolis, MN (US); Hai D. Pham, Eden Prairie, MN (US); Suresh Advani, Newark, DE (US); Karl Steiner, Newark, DE (US); Roderic Don, Newark, DE (US); Simon Bickerton, Waihcke Island (NZ); Ercument Murat Sozer, Istanbul (TR)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/549,220

(22) Filed: Apr. 13, 2000

(51) Int. Cl.⁷ .......................... B29C 39/00; B29C 35/08

(52) U.S. Cl. ................. 700/197; 425/135; 264/40.1
(58) Field of Search .......................... 700/197, 204; 425/135; 264/40.1, 40.3, 40.4, 40.5, 40.6, 40.7

(56) References Cited

U.S. PATENT DOCUMENTS 5,528,155 A * 6/1996 King et al. ................. 324/713

* cited by examiner

Primary Examiner—Leo Picard
Assistant Examiner—Sheela S Rao
(74) Attorney, Agent, or Firm—Kris T. Fredrick

(57) ABSTRACT

A sensor placement algorithm uses process data to determine the optimal distribution of sensors in a distributed parameter manufacturing system. An automatic classification procedure maps any problems in the process to a predetermined set of process disturbances. A control procedure uses process data to determine the best control action that will ensure good system response. Methods for sensor placement, automatic decision tree classification, corrective action control and the apparatus to effectuate these respective methods are integrated into a design methodology.

13 Claims, 3 Drawing Sheets

RESIN TRANSFER MOLDING

RELATED APPLICATION

This application is related to application Ser. No. 09/548,537, entitled "Sensor Placement and Control Design for Distributed Parameter Systems" filed on even date herewith.

GOVERNMENT INTEREST

This invention was made with United States Government support under contract F05242 of the Office of Naval Research. The Government may have certain rights in the invention.

TECHNICAL FIELD OF THE INVENTION

The present invention relates in general to methods and apparatus for the automatic control of manufacturing processes, and particularly to improve sensing and control methodologies for resin transfer molding.

BACKGROUND OF THE INVENTION

Resin transfer molding (RTM) is a technique of liquid composite molding (LCM) wherein a thermosetting resin is injected into a closed mold into which a fiber preform has been placed. The fiber preform (typically composed of fiberglass, carbon or graphite) imparts tensile strength, stiffness, toughness and mechanical reinforcement to the part. The thermoset resins (typically epoxies, polyamides, polyesters and phenolics) help in binding the fibers together, and impart compressive strength, dimensional and thermal stability and good fatigue properties to the part.

In the RTM process, a fiber is placed in a mold and the mold is closed. A polymer resin is injected into the mold and the fiber preform is impregnated with the resin. Once the filling of the mold is completed, the part is cured by subjecting it to a temperature-pressure recipe over time. During curing, a polymerization reaction occurs where the resin monomers are cross-linked to produce higher molecular weight polymers. Once the part is cured, the mold is opened, and the part is removed.

RTM is gaining popularity because of its net-shape forming capability, easy tailoring of final part properties, ease of use, and lower molding costs and time relative to other techniques like hand-layup and filament winding. RTM has been used to manufacture ship hulls, wheel bases for armored vehicles, and freight car panels, and numerous parts on military aircraft.

The mold filling stage and the resin curing stage of the RTM process are of particular importance because these stages are often particularly sensitive, thus errors often occur. For example, if resin injection and mold filling are not ideal, the fiber perform may not be completely impregnated and hence, voids or "dry spots" can occur in part. Voids can cause local areas of decreased strength in the part.

The control of resin transfer molding (RTM) is essentially a disturbance rejection problem in a batch setting. The main objective of RTM is to successfully fill a given mold without any dry spots. However, permeability changes within the mold and presence of air channels inducing racetracking scenarios cause major disturbances to the above objective.

Furthermore, current techniques to automatically control manufacturing processes have not adequately overcome a major challenge when developing a control strategy, which is to identify the disturbances for a batch and then implement the control action depending upon the type of disturbance. Indeed, many distributed parameter-manufacturing processes, like RTM mold filling, still rely on operator experience and heuristics. Other control strategies developed in the past have tried to generate a good recipe for filling the mold. The process inputs are specified a priori during the off-line design of this recipe. However, the issue of how a disturbance can be detected in the mold during on-line operation, and how to generate a corrective control action once it is detected, has not been addressed thus far.

For the reasons stated above, and for other reasons stated below which will become apparent to those skilled in the art upon reading and understanding the present specification, there is a need in the art for means and methods for detecting and identifying disturbances during on-line manufacturing operations and for automatically generating a corrective control action once a disturbance is detected in a distributed parameter manufacturing system.

SUMMARY OF THE INVENTION

The above mentioned problems with resin transfer molding processes and other problems are addressed by the present invention, which will be understood by reading and studying the following specification. Apparatus and methods are described which permit the detection of disturbances in a mold during system operation, and the generation of a corrective action control upon detection of the disturbance.

Briefly, the invention provides a computer-implemented method of controlling a resin transfer molding process, including identifying a set of possible disturbances in the process, determining locations within the process for a set of sensors such that the data for particular disturbances are significantly different from the sensor data for other disturbances, and constructing a set of one or more decision trees. Each of the trees has inputs from multiple ones of the sensors and has an output indicating one of the disturbances. The invention then determines at least one of a plurality of control actions, each control action ameliorating the disturbance indicated by the output of each terminal node of the decision tree.

DETAILED DESCRIPTION OF THE INVENTION

Figure 1:
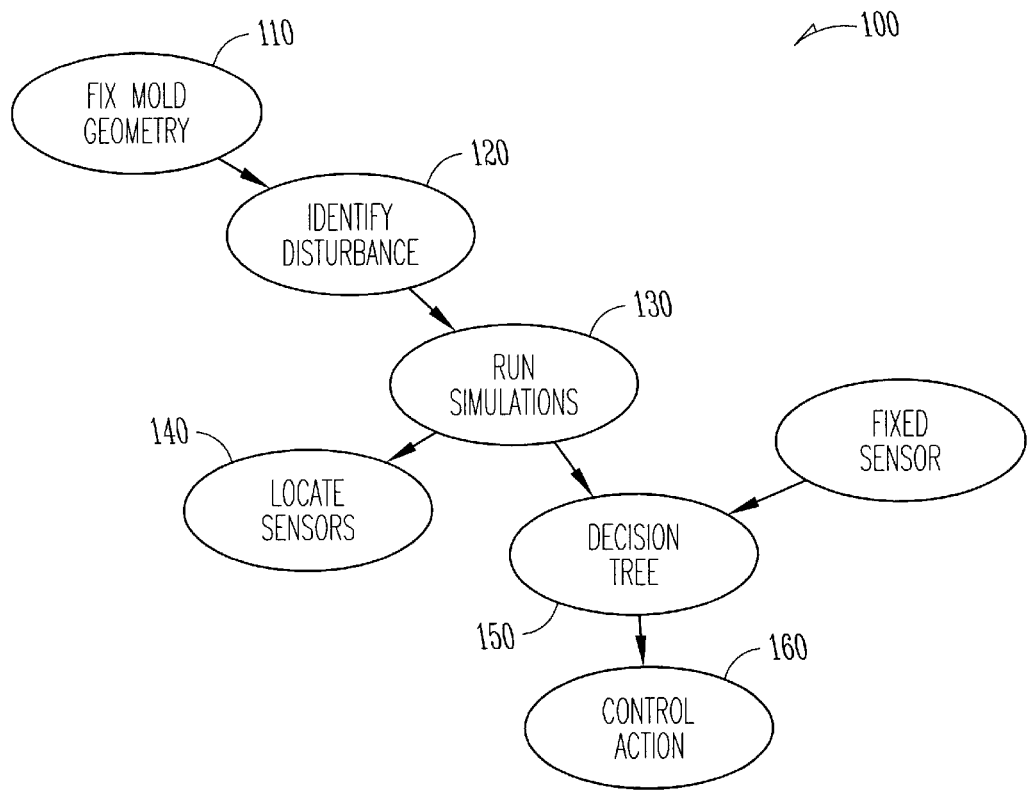
FIG. 1 is a high-level illustration of one embodiment of a control methodology for RTM, according to the present invention.

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. In particular, terms such as "optimum" and "optimize" are sometimes used here, as frequently in the art, to mean an improvement in one or more factors and not in the mathematical sense of a single best value of a parameter. The following detailed description is, therefore, not to be taken in a limiting sense.

When utilizing the RTM process, a mold geometry must be identified and fixed. Then various disturbances that might effect mold filling are to be identified. Once the various disturbance scenarios are identified, in addition to the case with no disturbances, then these scenarios are simulated using a simulation software. The next step is to locate the sensors in the mold so that a decision tree can be constructed. A sensor location algorithm is developed to place the sensors at optimal (with respect to construction of a decision tree) points in the mold. In cases where there is no flexibility in placing the sensors, for example, in the case where sensor locations are already fixed in the mold, the decision tree has to be built based on these sensors. It is not necessary to perform an optimization so as to pick points among the fixed sensor locations. Optimization, or to optimize, means to improve the characteristics of one or more parameters within a given process. Furthermore, optimization is not limited to merely meaning to change these characteristics to a mathematically best value. A decision tree algorithm then generates a decision tree which provides a systematic way to detect the disturbance when a batch is running so that effective control action can be taken. The decision tree is built using relative trip-times or wetting times of sensors located in the mold.

The sensor location algorithm picks points that are optimal for the construction of a decision tree. The decision tree algorithm constructs a decision tree based on the measurements of sensors for the various disturbance scenarios. It is not necessary that the sensor locations, which are the inputs to decision tree algorithm, are those generated by the sensor location algorithm. These two algorithms are independent of each other and could, for example, be used in succession.

Finally, a corrective control action is designed for each of the disturbances. Once the disturbance for a batch is detected, using the decision tree, its corresponding control action is to be implemented. This control methodology presented above can be implemented on various mold geometries.

The control of resin transfer molding can be thought of as a disturbance rejection problem in a batch setting. The main objective is to successfully fill a given mold without any voids or dry spots. However, permeability changes within the mold and presence of air channels inducing racetracking scenarios cause major disturbances to the above objective. a challenge in developing a control strategy is to identify the disturbances for a batch and the implement the control action depending upon the type of disturbance.

FIG. 1 illustrates one embodiment of a high-level control methodology (100) for an example manufacturing process, RTM, according to the present invention. After a mold geometry is fixed (110), the next step is to identify various disturbances (120) that might effect mold filling and thus cause errors. Once the various disturbance scenarios are identified, including the case with no disturbances, a model of the process is simulated, with the disturbance scenarios data incorporated into the simulation stage (130). A critical step is to locate the sensors in the mold so that a decision tree can be constructed. At the sensor placement stage (140), an algorithm is utilized to place the sensors at optimal (with respect to construction of a decision tree) points in the mold. In cases where there is no flexibility in placing the sensors, for example, in the case where sensor locations are already fixed in the mold, the decision tree has to be built based on theses sensors. In that case, no optimization is performed to pick points among the fixed sensor locations, and at the decision tree development stage (150), a decision tree is constructed based upon these fixed sensor locations. One embodiment optimization algorithm is elucidated below in the optimal sensor location section.

Optimal Sensor Location

A decision tree can be constructed when the data for a particular type of disturbance is significantly different from the data for other types. In other words, it is best suited to pick those points in the mold for which the time of wetting is different for different disturbance scenarios. This algorithm searches through the entire set of points that are obtained from the simulations and picks those points for which the deviations are maximum.

Also, it is very important to place sensors at locations where the disturbance can be detected as early as possible. The algorithm provides this facility where the user can specify the maximum time allowed for detection of the disturbance. The sensors are placed only at those points where the wetting time is less than the specified time. The user can also specify the minimum distance between two sensors. This will help in distributing the sensors over the mold. The procedure can be performed as follows.

1) Let the number of nodes in the mold be N.
2) Let the number of simulations run for different disturbances be m. The simulation with no disturbance is case 0.
3) Let t (I, j) denote the time of wetting the jth node for the ith simulation. So, t(0,j) would be the time of wetting of the jth node for case 0.
4) Compute the objective function J for each node using the following equation, w is a weighting factor for each case.

$$J = \sum_{i=1}^{m} w_i |t(i, j) - t(0, j)| \ldots \forall j$$

5) Sort the nodes in decreasing order of J, eliminating those which do not belong to the specified time zone.
6) The sorted list of nodes provides the optimal sensors locations, when the specified number of sensors is picked, care is taken that the minimum distance between two sensors is maintained. The distance between two nodes is calculated using the Euclidian norm.

The data about sensor location is an input for the decision tree development stage (150). At this point, the previously identified disturbances are classified and, with sensor location data, a decision tree is created. In other embodiments, a particular decision tree is selected from a previously-specified list. A decision tree provides a systematic way to detect the disturbance when a batch is running, so that effective control action can be taken. A decision tree can be built using times when the sensors in the mold are tripped. In another embodiment, a decision tree is constructed using the sequence of sensor trips (e.g., "Sensor A trips before sensors B and C"). The decision tree algorithm constructs a decision tree based on the measurements of sensors for the various disturbance scenarios. It is not necessary that the sensor locations which are the inputs to the decision tree algorithm are those generated by the sensor location algorithm.

Decision Trees

Given a set of measurements on an object, a decision tree is a systematic way of predicting what class the set belongs to. If $x_1$, $x_2$, $x_3$ are the measurement variables, then $$\bar{x}=[x_1, x_2, \ldots, x_n]$$

is called the measurement vector and $x \in \Re^n$ is called the measurement space. If there are J classes, then the set of these classes can be represented as $$C=\{1, 2, \ldots, J\}$$

where each of the j classes is identified by a number 1 to J.

A decision tree can be mathematically described as a function $d(\bar{X}): \Re^n \to C$ so that for every $\bar{x} \in x$, $d(\bar{x})=j$ $j \in C$. In other words, the decision tree can be partitioned into J subsets $-A_1, A_2, \ldots, A_j$, such that $$A_j=\{\bar{x}|d(\bar{x})=j\}$$

The subspaces $A_1, A_2, \ldots, A_j$ are disjoint and $$x = \bigcup_j A_j \quad j = 1 \text{ to } J$$

The classifier is constructed from learning samples, which form a set of measurement vectors L, or for which the class is known. Therefore, L is defined on the Cartesian product (",")of X and C.

$$L=\{(x_1,j_1), (x_2,j_2), \ldots, (x_N,j_N)\}$$

The decision tree is obtained by repeated splitting of subsets of L starting with L itself. The goal is to select each split of a subset so that the data in each of the descendant subsets are purer than the data in the parent subset. Splitting is continued until a particular class can be assigned to a subset. Such a subset is called a terminal subset. The splits are formed by conditions on the coordinates of the measurement space.

In a binary tree terminology, the measurement space is a root node $t_1$. The first split results in two nodes (subsets) $t_2$ and $t_3$. Once a good split of $t_1$ is found, a search is made for good splits of $t_2$ and $t_3$. This process is repeated until terminal nodes are formed when the results are good enough, according to a conventionally selected condition. Hence the construction of a tree consists of these three main tasks: the selection of splits, the rule for declaring a node as terminal, and assigning a class to a terminal node.

This procedure can be performed as follows.

1) Define node proportions p(j|t) as the proportion of the cases in node t that belong the class j. For example, if there are a total of N cases in L and $N_j$ belong to the class j. Then, $$p(j| \text{root node } t)=N_j/N$$

2) Define a measure I(t) of the impurity of a node t as a non-negative function $f$ such that I(t) is maximum only at the point (1/j, 1/j, 1/j, ... 1/j), assuming equal distribution of cases. I(t) achieves a minimum only at the points (1, 0, 0, ..., 0), (0, 10, ..., 0), ..., (0, 0, 0, ..., 1), i.e., along the basis vectors of the measurement space. (3) I(t) is asymmetric function of $p_1, p_2, p_3, \ldots, p_j$.

One example of an impurity function is:

$$\phi = I(t) = -\sum_{j=1}^{J} p(j|t)\log p(j|t)$$

Therefore, I(t) ensures that the node impurity is largest when all the cases are equally mixed together in the node and smallest when the node contains only one class.

Figure 2:
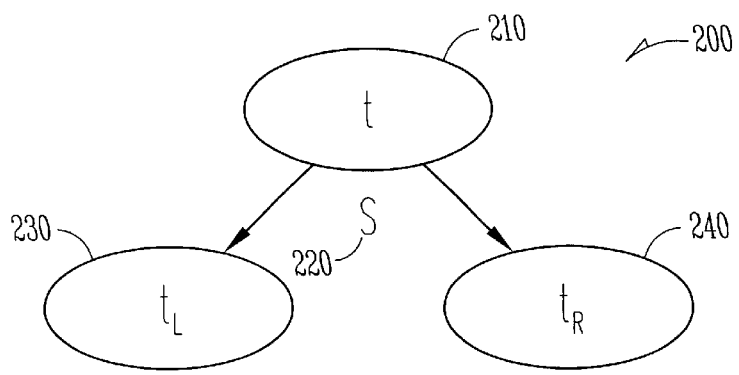
FIG. 2 illustrates a single split in a binary decision tree according to one embodiment of the present invention.

FIG. 2 illustrates a single split (200) in a binary decision tree according to one embodiment of the present invention. Generally, FIG. 2 shows a node t (210), of case N, undergoing a binary split s (220) to produce $t_L$ (230), in case $N_L$, and $t_R$ (240), in case $N_R$. More specifically, for any node t (210) suppose that there exists a split s (220) which divides the node into $t_L$ (230) and $t_R$(240) such that a proportion $p_L$ go to $t_L$ (230) and proportion $p_R$ go to $t_R$ (240) as shown in FIG. 2. Then, continuing the procedure steps, 4) The goodness of the split is defined as the decrease in impurity due to a particular split s (220), $$\Delta i(s, t)=i(t)-p_L i(t_L)-p_R i(t_R)$$

Define a candidate set S of binary splits s (220) at each node. Generally, one can conceive the set as a set of questions of the form $$S=\{Is\ x_i<c?\}x_i\epsilon\bar{x};\ c\epsilon(-\infty, \infty)$$

Then the associated split s sends $\bar{x}$ in t that answers "yes" to $t_L$ (220) and all $\bar{x}$ in t (210) that answer "no" to $t_R$ (240).

5) To select the split that is most "optimal," we need a criterion that maximizes the decrease in impurity.

$$\Delta i(s^*,t)=\max(\Delta i(s,t))s \in S$$

Then it is split into $t_L$ and $t_R$ using the split ($s^*$) and the same procedure for best s is repeated on both $t_L$ (270) and $t_R$ (240).

6) The other important issue is to determine when to stop splitting. This can be done in at least two ways.

One approach is to continue splitting until one reaches a point where there is no significant decrease in the impurity; i.e., if $$\Delta i(s^*,t)<\beta$$

then t (210) is a terminal node.

In another embodiment, terminal nodes can be obtained by continuing to split nodes until reaching a pre-specified number of cases per terminal node; i.e., stop when $$N(t)<N_{min}$$

Then a search is performed to combine some terminal nodes of the same class and get a pruned tree. This method makes the value of $\beta$ depend upon the measurement space.

7) After the terminal nodes are obtained, the class for a terminal node can be determined. Specifically if $$p(j_0|t)=\max\ (p(j|t))$$

then t (210) is designated as a class $j_0$ terminal node.

Control Actions

Within the control action stage (160), a corrective control action is designed for each of the disturbances. Once the disturbance for a batch is detected, using the decision tree, its corresponding control action is to be implemented.

There are many possible actions to reject a disturbance once it is detected in the mold. One can change the flow rate or injection pressure of the resin at a gate, change locations of the gate and add more gates. A good search for an optimal control strategy employs genetic algorithms, because of the difficulty of evaluating a function appropriate for gradient-descent algorithms. Other strategies can be employed, however.

Figure 3:
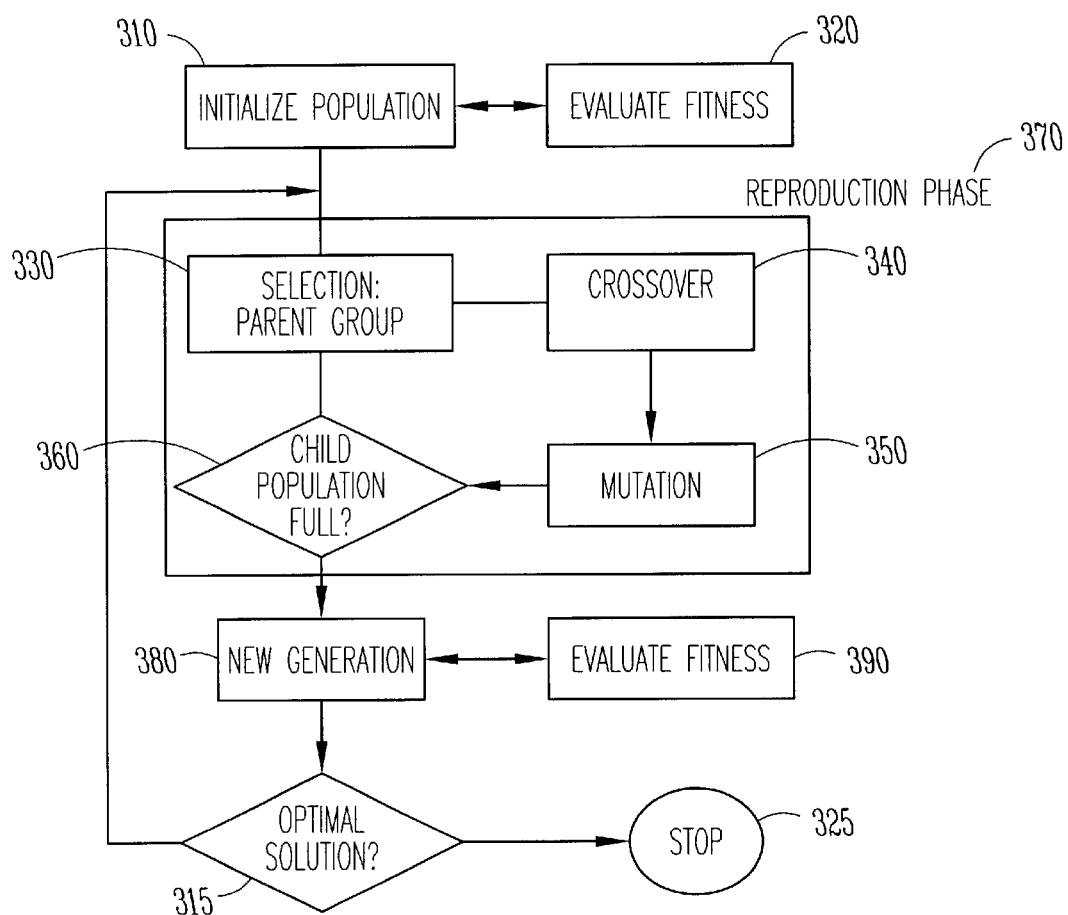
FIG. 3 illustrates a simple genetic algorithm according to the prior art.

FIG. 3 illustrates a simple genetic algorithm (300) according to the prior art. Genetic algorithms are based on principles of evolution. A candidate solution is encoded in a binary string or "chromosome" in genetic algorithm terminology. To start the algorithm, a population of chromosomes is first randomly generated in the initialize population stage (310). Then a parent group is selected based on the fitness of the chromosomes in the evaluate fitness stage (320) according to a fitness function based on an objective function. For example, the most fit chromosome is taken as the optimal solution. The population then enters the reproduction phase (370), where elected parent groups are initially put into stage (330). Next, within the crossover (340) and mutation (350) stages of the procedure, genetic operators that mimic recombination and mutation are used on the parent group to obtain the new generation chromosomes.

Once the mutation occurs, the child population is evaluated for saturation (360), and, once the child population is full or saturated, the population is classified as the new generation (380). The new generation (380) is evaluated for fitness (390), similar to the previous fitness evaluation stage (320). The generation is evaluated for optimal fitness (315). If that new generation is not fit, the process begins again at the reproduction phase (370), and the algorithm is repeated. Successive generations will produce more fit chromosomes, thereby leading to an optimal solution. When an optimal solution is found, the process stops (325).

The following references provide further background to genetic algorithms and are hereby incorporated by reference: Koza, John R., GENETIC PROGRAMMING: ON THE PROGRAMMING OF COMPUTERS BY MEANS OF NATURAL SELECTION (MIT Press, 1992); and Banzhaf, Wolfgang et al., GENETIC PROGRAMMING—AN INTRODUCTION (Morgan Kaufman, 1998).

To apply the genetic algorithm to control of RTM, the gate locations and gate pressures are encoded into a bit string (chromosome). A fitness function, F, is selected based on the percentage of voids and the fill time of the mold; for example, $$F = A - a(t_f/t_{fmax}) - b(V_f/V_{fmax})$$

where a and b are relative weights for time of fill and percentage voids respectively and A is sufficiently large number to make F positive. Variables $t_f$ and $t_{fmax}$ represent time to fill and maximum time to fill; $V_f$ and $V_f$max represent void fraction and maximum void fraction.

A System

Figure 4:
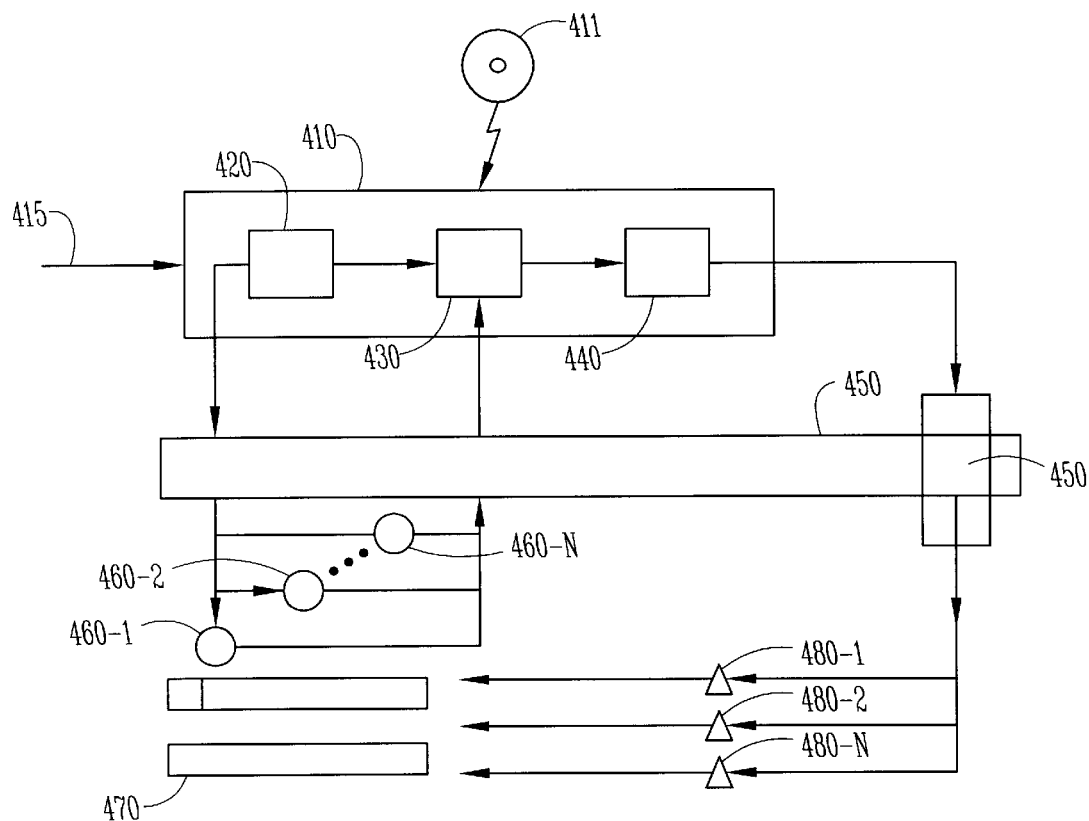
FIG. 4 illustrates a distributed parameter system according to the present invention.

FIG. 4 illustrates an illustrative system (400) for manufacturing articles with a distributed parameter process, according to the present invention. Shown is a processor (410), including memory or medium (411), wherein a sensor placement module (420), a disturbance classification module (430) and a control action module (440) reside. Also shown are a plurality of sensors (460-I through 460-N), actuators (480-I through 480-N), and an input/output device (450) and a process (470). The plurality of sensors (460-I through 460-N) in one embodiment are located within the process (470) such that the data of particular disturbances are significantly different from the sensor data of other disturbances. The input/output device (450) is used for communicating the sensor data and control actions between modules 420–440 a control action module (440) and the plurality of sensors 460 and actuators (480). Actuators 480-I through 480-N modify parameters of the process (470) in response to the control actions.

The processor (410) manipulates a set of decision trees, each having inputs from the sensors (460-I through 460-N) and having an output indicating one of the disturbances. The processor (410) also generates a plurality of control actions, each ameliorating the one disturbance indicated by the output of one decision tree.

In another embodiment of processor (410), the sensor placement module (420) manipulates the location of sensors (460-I through 460-N) to optimize process performance and minimize errors according to present invention. The sensor placement module (420) sends various data, including disturbance data, to the disturbance classification module (430). The disturbance classification module (430) receives data as to sensor locations and creates or selects a decision tree in response to this data. In one embodiment, the disturbance classification module (430) receives data as to sensor locations directly from a sensor location algorithm present in the sensor placement module (420). Once the disturbance for a particular batch in the process (400) is detected, using the decision tree output within the disturbance classification module, the control action module (440) implements a control action that corresponds to the disturbance.

The sensor placement, decision tree generator, and control action formulation are done off-line, as part of the design engineer's task of improving process operation. The output of the decision trees and the control actions for each disturbance are encoded in machine-readable code at the end of the off-line design phase.

Figure 5:
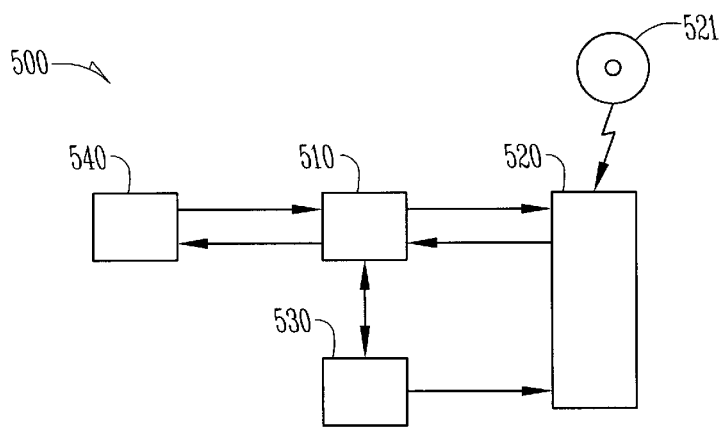
FIG. 5 illustrates a computer system for developing manufacturing processes, according to the present invention.

FIG. 5 illustrates a computer system for developing manufacturing processes (500), according to the present invention. Shown are processor (510), a memory (520) possibly employing a medium such as 521, an input/output device (530), and data representing a distributed parameter system (540). The processor (510) identifies a set of possible disturbances in one of the processes based upon data from the distributed parameter system (540). After this identification, the processor (510) uses the disturbance data to determine the locations within a process for a given set of sensors such that the data for particular disturbances are significantly different from the sensor data for other disturbances. The processor (510) uses the disturbance data when constructing a set of decision trees, each having inputs from multiple sensors and having an output indicating one of the disturbances. The processor (510) also determines a plurality of control actions as a result, and each control action ameliorates the one disturbance indicated by the output of the decision tree for the one process. The memory (520) holds data relating to the disturbances, sensor locations, decision trees and the control actions. The input/output device (530) receives data relating to the processes and transmits data relating to their respective decision trees and control actions.

On-line operation, when the process is actually running, employs a computer, data acquisition devices, and control devices to read sensor data, to walk down the decision trees generated in the design phase, to determine which disturbance is occurring in the system, and to output a control action for minimizing the disturbance.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention.

What is claimed is:

1. A computer-implemented method of controlling a resin transfer molding process, comprising:
    identifying a set of possible disturbances in the molding process;
    determining locations within a mold for a set of sensors such that the data for particular disturbances are significantly different from the sensor data for other disturbances;
    constructing a set of decision trees, each of the trees having inputs from multiple ones of the sensors and having an output indicating one of the disturbances;
    determining a set of control actions for corresponding ones of the trees.

2. The method of claim 1, wherein the sensors are wetting sensors in a mold.

3. The method of claim 2, further includes determining locations within the process for a set of sensors such that the wetting time for a particular disturbance is significantly different from the wetting time for other disturbances.

4. The method of claim 1, further includes determining locations within the mold for a set of sensors such that any one sensor is maintained at a certain predetermined distance from other sensors.

5. The method of claim 1, wherein determining the sensor locations includes simulating the molding process both with at least one of the disturbances and without any disturbance.

6. The method of claim 1, further comprising placing the sensors at the determined locations in the mold.

7. A medium for holding representations of instructions and data for causing a suitably programmed computer to carry out the method of claim 1.

8. A computer program for controlling a resin transfer molding process, the program comprising:
    an identification module for identifying a set of possible disturbances in the process;
    a location-determining module for determining locations within a resin-transfer mold for a set of sensors such that the data for particular disturbances are significantly different from the sensor data for other disturbances;
    a decision-constructing module for constructing a set of decision trees, each of the trees having inputs from multiple ones of the sensors and having an output indicating one of the disturbances; and
    an action-determining module for determining at least one of a plurality of control actions, each control action ameliorating the one disturbance indicated by the output of the one decision tree.

9. The program of claim 8 where one of the control actions comprises changing a flow rate of a resin.

10. The program of claim 8 where one of the control actions comprises changing an injection pressure of a resin.

11. A method of determining optimal sensor locations in a resin transfer molding process, comprising:
    establishing a plurality of nodes in a resin transfer mold;
    running M simulations for a plurality of disturbances, and a simulation with no disturbances;
    establishing a process simulation function responsive to at least one process parameter; and a number 1 that represents a particular iteration of the current simulation;
    establishing an objective function equaling the summation, ranging from simulations 1 to M, of a weighting factor multiplied by the difference between the process simulation functions with the disturbances and the process simulation function for the simulation with no disturbances;
    specifying an acceptable range for the objective function output;
    eliminating those nodes which do not have an objective function output value within an acceptable range; and
    assigning a plurality of sensors to the remaining nodes.

12. The method of claim 11, further comprising providing that the plurality of sensors assigned to a particular node are spaced a minimum distance from each other.

13. The method of claim 12, where the minimum distance is calculated using a Euclidean norm.

* * * * *